Figure 1:
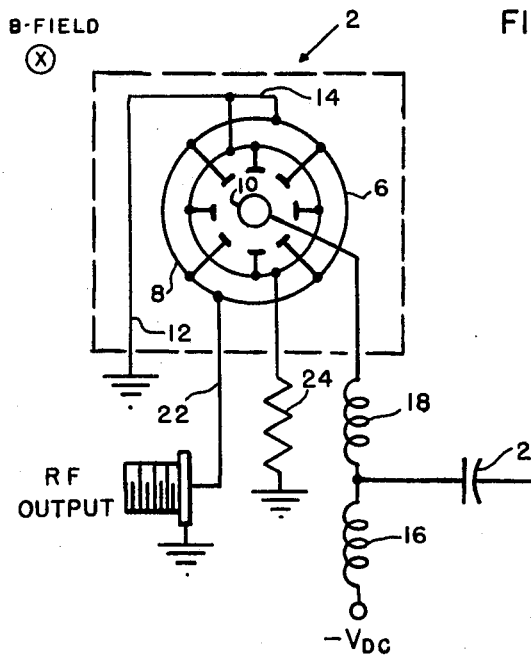
Figure 1:
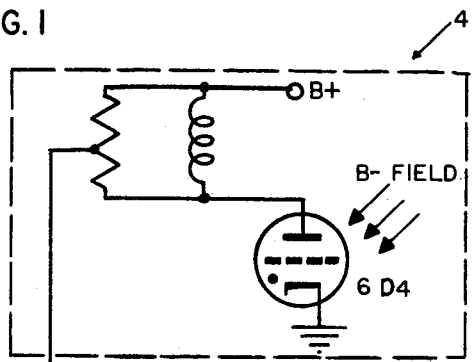

United States Patent
Peters, Jr. et al.

[15] 3,699,575
[45] Oct. 17, 1972

[54] EXPANDABLE BANDWIDTH RADAR JAMMER

[72] Inventors: Philip H. Peters, Jr., Schenectady; Donald A. Wilbur, Albany, both of N.Y.

[22] Filed: March 4, 1955

[21] Appl. No.: 492,326

[52] U.S. Cl. ...............................343/18 E, 343/18 D
[51] Int. Cl. .............................G01s 7/42, H04k 3/00
[58] Field of Search ........250/17; 343/18, 18 D, 18 E

[56] References Cited

UNITED STATES PATENTS 2,538,069   1/1951   Williams......................325/19

*Primary Examiner*—Malcolm F. Hubler
*Attorney*—Harry M. Saragovitz

EXEMPLARY CLAIM

2. A system for generating radar jamming signals comprising a pair of magnetron oscillators having their outputs additively combined and each adapted to be voltage tuned for generating radio-frequency energy over a wide range of frequencies, said range being substantially the same for each magnetron, a first and second direct-current potential of given magnitude applied as respective anode voltages to each of said magnetrons whereby each of said magnetrons generates radio-frequency energy at a frequency which is substantially at the center of said range of frequencies, and means for independently varying the magnitudes of said given anode potentials in a random manner whereby the combined output from said magnetrons results in noise signals varying randomly in amplitude and frequency.

9 Claims, 2 Drawing Figures

PATENTED OCT 17 1972 3,699,575

INVENTORS.
DONALD A. WILBUR
BY  PHILIP H. PETERS JR.

*Frederick M. Strader*

ATTORNEY

EXPANDABLE BANDWIDTH RADAR JAMMER

This invention relates to radar frequency jamming transmitters and more particularly to radar frequency jammers employing noise modulated signals.

It is well known that noise may be directly generated in a magnetron under conditions of heavy loading and asymmetry of the interaction space. Applying these principles to voltage-tuned magnetrons, it was found that by changing only the anode voltage, the carrier frequency could be shifted over a wide band and that the signal so tuned was random noise which was available as a jamming signal. However, such a band was limited in width to 25 megacycles, and because of this relatively narrow noise band, the effectiveness of such a system as a jammer was dependent upon the bandwidth of the receiver to be masked.

It is an object of the present invention, therefore, to provide a radar frequency jammer which not only permits voltage tuning but which also provides a control over the resultant noise bandwidth.

It is another object of the present invention to provide a radar frequency jammer which will effectively jam a receiver regardless of its bandwidth.

It is another object of the present invention to provide a radar frequency jammer suitable for effective spot or barrage jamming of the receiver regardless of its bandwidth.

It is yet another object of the present invention to provide a frequency modulated noise generator having an expandable bandwidth.

In accordance with a preferred embodiment of the present invention, there is provided a system for generating radar jamming signals which includes a pair of magnetron oscillators having their outputs additively combined and each adapted to be voltage tuned such that the frequency of the magnetron output is proportional to the magnitude of the direct-current potentials applied to the respective anodes thereof. Each of the magnetrons is adapted to be tuned over substantially the same frequency range. Also included are means for initially voltage tuning each of said magnetrons whereby the discrete output energy from said magnetrons is substantially at the center frequency of said range of frequencies. Means are also included for independently and randomly varying each of said initial voltage tuning means whereby the combined output of said magnetrons results in modulated noise signals varying randomly in frequency and amplitude. In accordance with another embodiment of the present invention only one of the voltage tuning means is varied in a random manner.

Figure 2:
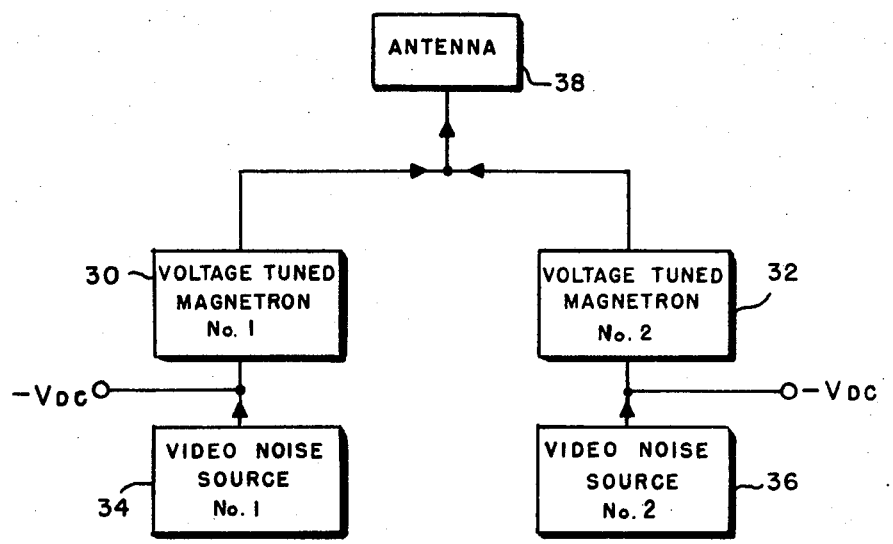

For a better understanding of the invention, together with other and further objects thereof, reference is had to the following description taken in connection with the accompanying drawing in which:

FIG. 1 is a schematic diagram illustrating one basic component of the radar jamming system, and FIG. 2 is a block schematic diagram of a preferred embodiment of our invention.

In FIG. 1 of the drawing there is shown an expandable bandwidth tuned frequency-modulated noise generator comprising a magnetron 2 adapted to be voltage tuned and a video noise generator 4 which includes a 6D4 type tube having a magnetic field B applied thereto as indicated. Such video noise generators are so well known in the art that no further description thereof is believed necessary. One type of voltage tuned magnetron which may be employed is described in our application Ser. No. 360,328, filed June 8, 1953. In such magnetrons, there is no inherent limitation on the rate at which the frequency of a voltage tuned magnetron may be changed. Thus, such tubes are ideally suited for frequency modulation as will hereinafter be explained.

The frequency of operation of a voltage tuned magnetron is determined by and is proportional to the anode voltage, other operation parameters remaining constant. As shown schematically in FIG. 1, the anode of magnetron 2 is of the interdigital type with one set of anode segments connected to ring 6, and the other set of anode segments to ring 8, and the cathode is designated at 10. Anode 6 is grounded through one end of lead 12, the other end of lead 12 being connected to the internal closed loop tank circuit 14. A constant operating frequency is produced from the output of magnetron 2 by means of a fixed direct-current anode voltage designated as $-V_{DC}$ which is shown applied to cathode 10 through video choke coil 16 and radio-frequency choke coil 18 respectively. The output of video noise generator 4 is coupled to the junction of choke coils 16 and 18 through capacitor 20. The frequency output from magnetron 2 is taken from one set of anode segments through lead 22 while the other set of anode segments is connected to a dummy load indicated at 24.

It is well known that if a varying modulating voltage is added to the direct-current anode voltage, frequency modulation of the radio-frequency magnetron output is produced. The bandwidth covered by the energy in the resultant radio-frequency signal depends, of course, upon the modulation index. This bandwidth may be increased by increasing the modulation voltage or may be reduced by reducing the modulation voltage and it will have a minimum value equal to no less than twice the highest frequency contained in the modulation signal. Now, if the modulation signal comprises the output from a video noise generator as indicated at 4, the output frequency of magnetron 2 will vary in a random manner and the sideband component pairs produced will vary randomly in frequency and amplitude. The total bandwidth occupied by the sideband component pairs produced will vary randomly in frequency and amplitude and will be a function of the magnitude of the modulation voltage. However, the amplitude of the resultant output radio-frequency signal from magnetron 2 will remain constant.

The minimum bandwidth will be twice that of the highest frequency contained in the video noise signal with an energy-frequency distribution determined by the many modulation indices. Since each modulation index is inversely proportional to its modulation frequency, the sideband energy will be concentrated close to the carrier, as determined by $-V_{DC}$, for small degrees of carrier deviation. Such an action is most desirable for narrow-band jamming. By merely increasing the magnitude of the modulation voltage, the bandwidth of the radio-frequency noise signal may be continuously increased from the minimum thereby providing a relatively simple means for producing a noise signal whose bandwidth is controllable over a wide range of frequencies. For bandwidths less than maximum, the center frequency of the noise band may be rapidly, and if desired, automatically, tuned to the frequency of any signal it is desired to jam by merely varying the anode voltage. By such an arrangement, the maximum bandwidth over which the magnetron energy can be distributed by the modulation will correspond closely to the tuning range of the magnetron. It has been found that the radio-frequency noise components are distributed over a range as large as two to one.

Inasmuch as the output signal from the system shown in FIG. 1 is frequency modulated noise, it will jam any frequency modulated device. However, it will also jam any amplitude modulated device whose bandwidth is less than the frequency modulated noise.

FIG. 2 shows a system for combining the output of two expandable bandwidth voltage-tuned noise generators which are each frequency modulated by independent noise sources to produce a resultant noise signal that will jam a receiver regardless of its bandwidth. As shown in FIG. 2, 30 and 32 are voltage tuned magnetrons identical in construction to that described in connection with FIG. 1, and 34 and 36 are similar video noise generators which are identical in construction to the video noise generator 4 of FIG. 1. Each of the magnetrons is tuned to substantially the same center frequency by means of anode voltages $-V_{DC}$ and the outputs of the video noise generators are respectively applied as frequency modulating signals which vary the applied direct-current voltages. The outputs of magnetrons 30 and 32 are additively combined by any suitable means well known in the art and are fed to antenna 38.

With both magnetrons 30 and 32 operating at substantially the same center frequencies and frequency modulated by independent noise sources 34 and 36 respectively, the two output frequencies from the magnetrons will vary randomly with respect to each other and there will be no relation between the sideband components of the frequency modulated signals. Hence, the addition of two such independently noise modulated signals gives a resultant signal which varies randomly in amplitude due to the beating action of the two random frequency signals. It has been found that such a resultant signal produced a noise signal which completely masked the receiver output thus producing the same effect as directly generated noise. Since the bandwidth occupied by the frequency modulated signals may be increased to cover the full tuning range of the voltage tuned magnetrons by increasing the magnitude of the modulation voltage, either spot or extremely broadband barrage jamming may be produced. Tuning ranges in excess of one and one-half in ratio have been observed. For bandwidths less than maximum, the center frequency to which each magnetron is tuned may be rapidly and, if desired, automatically, tuned to center on any signal it is desired to jam.

An action similar to that described in connection with FIG. 2 may also be obtained when only one noise source is used so that only one of the center frequencies is noise modulated. If a noise modulated and an unmodulated signal are both in the passband of a receiver, a beating will be obtained between the two signals to produce amplitude fluctuations and thus produce noise. Best results were obtained, however, when both signals were modulated as in FIG. 1.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for generating radar jamming signals comprising a pair of magnetron oscillators having their outputs additively combined and each adapted to be voltage tuned for generating radio-frequency energy over a wide range of frequencies, said range being substantially the same for each magnetron, means for initially voltage tuning each of said magnetrons whereby the discrete output energy from said magnetrons is substantially at the center frequency of said range, and means for independently varying each of said initial voltage tuning means in a random manner whereby the combined output of said magnetrons comprises frequency modulated noise signals varying randomly in amplitude.

2. A system for generating radar jamming signals comprising a pair of magnetron oscillators having their outputs additively combined and each adapted to be voltage tuned for generating radio-frequency energy over a wide range of frequencies, said range being substantially the same for each magnetron, a first and second direct-current potential of given magnitude applied as respective anode voltages to each of said magnetrons whereby each of said magnetrons generates radio-frequency energy at a frequency which is substantially at the center of said range of frequencies, and means for independently varying the magnitudes of said given anode potentials in a random manner whereby the combined output from said magnetrons results in noise signals varying randomly in amplitude and frequency.

3. The system in accordance with claim 2 wherein said last mentioned means comprises a first and second video noise source having their discrete outputs respectively coupled to each of said magnetrons.

4. A system for generating radar jamming signals comprising a pair of magnetron oscillators having their outputs additively combined and each adapted to be voltage tuned for generating radio-frequency energy over a wide range of frequencies, said range being substantially the same for each magnetron, means for initially voltage tuning each of said magnetrons whereby the discrete output energy from said magnetrons is substantially at the center frequency of said range, and means for varying only one of said voltage tuning means in a random manner whereby the combined output of said magnetrons comprises frequency modulated noise signals varying randomly in amplitude.

5. A system for generating radar jamming signals comprising a pair of magnetron oscillators having their outputs additively combined and each adapted to be voltage tuned for generating radio-frequency energy over a wide range of frequencies, said range being substantially the same for each magnetron, a first and second direct-current potential of given magnitude applied as respective anode voltages to each of said magnetrons whereby each of said magnetrons generates radio-frequency energy at a frequency which is substantially at the center of said range of frequencies, and means for randomly varying the magnitude of only one of said anode potentials whereby the combined output from said magnetron comprises noise signals varying randomly in amplitude and frequency.

6. The system in accordance with claim 5 wherein said last mentioned means is a video noise source.

7. In a radar jamming transmitter including a pair of voltage-tuned magnetron oscillators whose outputs are additively combined and each of whose output frequency is proportional to the magnitude of the direct-current potential applied to the respective anodes of said magnetrons, the method of generating noise jamming signals comprising the steps of initially voltage tuning each of said magnetrons whereby two substantially identical discrete frequencies are generated, and independently varying the initial voltage tuning applied to each magnetron in a random manner whereby noise signals varying randomly in amplitude and frequency are generated at the combined output of said magnetrons.

8. In a radar jamming transmitter including a pair of voltage tuned magnetron oscillators whose outputs are additively combined and each of whose output frequency is proportional to the direct-current potential applied to the respective anodes of said magnetrons, the method of generating jamming noise signals comprising the steps of applying discrete direct-current potentials to each of said anodes for producing discrete outputs from said magnetrons at a prescribed frequency, and independently varying the magnitude of each of said applied voltages in a random manner whereby the combined output from said magnetrons results in noise signals varying randomly in amplitude and frequency.

9. In a radar jamming transmitter including a pair of voltage tuned magnetron oscillators whose outputs are additively combined and each of whose output frequency is proportional to the direct-current potential applied to the respective anodes of said magnetrons, the method of generating noise jamming signals comprising the steps of initially voltage tuning each of said magnetrons so as to generate two substantially identical discrete frequencies, and varying the initial voltage tuning applied to one of said magnetrons in a random manner for producing noise signals varying randomly in amplitude and frequency at the combined output of said magnetrons.

* * * * *